(12) United States Patent
Smadja (10) Patent No.: US 6,173,298 B1
(45) Date of Patent: *Jan. 9, 2001

(54) METHOD AND APPARATUS FOR IMPLEMENTING A DYNAMIC COLLOCATION DICTIONARY

(75) Inventor: Frank Smadja, Haifa (IL)

(73) Assignee: ASAP, Ltd. (IL)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/936,190

(22) Filed: Sep. 17, 1997

Related U.S. Application Data (60) Provisional application No. 60/026,209, filed on Sep. 17, 1996.

(51) Int. Cl.[7] .................... G06F 15/00; G06F 17/00
(52) U.S. Cl. ................................. 707/532; 707/500
(58) Field of Search .................... 707/500, 526, 707/530–533, 2–7, 512; 704/7–9, 10, 4

(56) References Cited

U.S. PATENT DOCUMENTS

| | | | |
|---|---|---|---|
| 3,568,155 | 3/1971 | Abraham et al. | 340/172.5 |
| 3,916,387 | 10/1975 | Woodrum | 340/172.5 |
| 4,522,482 | 6/1985 | Pettigrew et al. | 355/3 R |
| 4,606,002 | 8/1986 | Waisman et al. | 364/200 |
| 4,630,235 | 12/1986 | Hashimoto et al. | 364/900 |
| 4,674,066 | 6/1987 | Kucera | 364/900 |
| 4,849,898 | 7/1989 | Adi | 364/419 |
| 4,864,501 | 9/1989 | Kucera et al. | 364/419 |
| 4,864,502 | 9/1989 | Kucera et al. | 364/419 |
| 4,868,750 | 9/1989 | Kucera et al. | 364/419 |
| 4,942,526 | 7/1990 | Okajima et al. | 364/419 |
| 4,991,087 | 2/1991 | Burkowski et al. | 364/200 |
| 5,099,426 | 3/1992 | Carlgren et al. | 364/419 |

(List continued on next page.)

OTHER PUBLICATIONS

Maarek, Y.S., et al., "Full Text Indexing Based on Lexical Relations. An Application: Software Libraries", Proceedings of the 12th Annual International ACM SIGIR Conference on Research and Development in Infomation Retrieval, ACM Press, 198–206 (1989).

Salton, G., Automatic Text Processding, Addison–Wesley Publishing Company, Reading MA, 229–312 (1989).

Smadja, F., "Retrieving Collocations from Text: Xtract", Computational Linguistics, 19, 143–178 (Mar. 1993).

Smadja, F., "XTRACT: An Overview", Computers and the Humanities, 26, 399–413 (1993).

* cited by examiner

Primary Examiner—Joseph H. Feild
Assistant Examiner—Alford W. Kindred
(74) Attorney, Agent, or Firm—Lahive & Cockfield, LLP (57) ABSTRACT

The present invention is method and apparatus for implementing a dynamic collocation dictionary. Bigrams and their frequency in a document are ascertained. Bigrams that are potentially collocations are selected. Entries in a dynamic collocation dictionary are updated for selected bigrams already present in the dynamic collocation dictionary. Selected bigrams, not present in the dynamic collocation dictionary, are entered in the dynamic collocation dictionary.

29 Claims, 3 Drawing Sheets

U.S. PATENT DOCUMENTS

| | | | |
|---|---|---|---|
| 5,128,865 | 7/1992 | Sadler | 364/419 |
| 5,151,857 | 9/1992 | Matsui | 364/419 |
| 5,167,011 | 11/1992 | Priest | 395/54 |
| 5,168,565 | 12/1992 | Morita | 395/600 |
| 5,225,981 | 7/1993 | Yokogawa | 364/419 |
| 5,241,674 | 8/1993 | Kuorsawa et al. | 395/600 |
| 5,263,159 | 11/1993 | Mitsui | 395/600 |
| 5,278,980 | 1/1994 | Pedersen et al. | 395/600 |
| 5,303,367 | 4/1994 | Leenstra, Sr. et al. | 395/600 |
| 5,309,359 | 5/1994 | Katz et al. | 364/419.19 |
| 5,317,507 | 5/1994 | Gallant | 364/419.13 |
| 5,321,608 | 6/1994 | Namba et al. | 364/419.08 |
| 5,321,833 | 6/1994 | Chang et al. | 395/600 |
| 5,325,298 | 6/1994 | Gallant | 364/419.19 |
| 5,331,556 | 7/1994 | Black, Jr. et al. | 364/419.08 |
| 5,369,577 | 11/1994 | Kadashevich et al. | 364/419.13 |
| 5,375,233 | 12/1994 | Kimber et al. | 395/600 |
| 5,383,120 * | 1/1995 | Zernik | 364/419.08 |
| 5,404,295 | 4/1995 | Katz et al. | 364/419.19 |
| 5,406,480 | 4/1995 | Kanno | 364/419.08 |
| 5,440,481 | 8/1995 | Kostoff et al. | 364/419.08 |
| 5,444,842 | 8/1995 | Bentson et al. | 395/161 |
| 5,450,580 | 9/1995 | Takada et al. | 395/600 |
| 5,454,096 | 9/1995 | Otsuka et al. | 395/401 |
| 5,490,274 | 2/1996 | Zbikwoski et al. | 395/700 |
| 5,513,126 | 4/1996 | Harkins et al. | 364/514 A |
| 5,530,852 | 6/1996 | Meske, Jr. et al. | 395/600 |
| 5,535,121 | 7/1996 | Roche et al. | 364/419.08 |
| 5,535,382 | 7/1996 | Ogawa | 395/600 |
| 5,537,317 | 7/1996 | Schabes et al. | 364/419.08 |
| 5,537,589 | 7/1996 | Dalal | 395/600 |
| 5,539,665 | 7/1996 | Lamming et al. | 364/514 R |
| 5,541,836 | 7/1996 | Church et al. | 364/419.07 |
| 5,542,090 | 7/1996 | Henderson et al. | 395/600 |
| 5,544,049 | 8/1996 | Henderson et al. | 364/419.19 |
| 5,546,578 | 8/1996 | Takada | 395/600 |
| 5,550,965 | 8/1996 | Gabbe et al. | 395/154 |
| 5,555,409 | 9/1996 | Leenstra, Sr. et al. | 395/600 |
| 5,560,007 | 9/1996 | Thai | 395/600 |
| 5,566,302 | 10/1996 | Khalidi et al. | 395/200.09 |
| 5,577,243 | 11/1996 | Sherwood et al. | 395/607 |
| 5,588,138 | 12/1996 | Bai et al. | 395/497.04 |
| 5,594,837 | 1/1997 | Noyes | 365/63 |
| 5,608,623 | 3/1997 | Sata et al. | 395/754 |
| 5,608,904 | 3/1997 | Chaudhuri et al. | 395/602 |
| 5,610,812 | 3/1997 | Schabes et al. | 395/759 |
| 5,613,034 | 3/1997 | Ney et al. | 395/2.6 |
| 5,659,732 | 8/1997 | Kirsch | 395/605 |
| 5,677,835 * | 10/1997 | Carbonell et al. | 364/419.02 |
| 5,799,276 * | 8/1998 | Komissarchik et al. | 704/251 |
| 5,835,087 * | 11/1998 | Herz et al. | 345/327 |

METHOD AND APPARATUS FOR IMPLEMENTING A DYNAMIC COLLOCATION DICTIONARY

RELATED APPLICATION

This application claims the benefit of U.S. Provisional Application No. 60/026,209, filed Sep. 17, 1996.

A portion of this disclosure of this patent document contains material which is subject to copyright protection. The copyright owner has no objection to the facsimile reproduction by anyone of the patent disclosure, as it appears in the Patent and Trademark Office files or records, but otherwise reserves all copyrights whatsoever.

FIELD OF THE INVENTION

The present invention relates generally to electronic technology, and more specifically to information technology.

BACKGROUND OF THE INVENTION

With the advent of the Internet, computer users can access a wealth of information with relative ease. Users may request information about a particular topic from sources connected to the Internet. The users seek to uncover relevant information.

For example, to obtain information, a user enters one or more search terms into an information retrieval system, such as a search engine, which then provides the user with locations of documents that include the search terms. To identify such documents, the search engine indexes all documents, and maintains a database including terms, such as words, and the locations of documents including those terms. The database is regularly updated by the search engine to include data about recently added or amended documents.

Information about one topic may be identified by many different words. For example, documents pertaining to the President of the United States of America may be uncovered by the search terms 'President' or 'Commander-In-Chief.' However, groups of words, such as 'Executive branch,' may also identify the same topic. One type of group of words that may identify a topic is a collocation.

A collocation is a group of words whose meaning cannot be inferred from the individual meanings of its constituent words. For example, the term 'White House' refers to the home and office of the President of the United States of America, and does not simply mean a house that is white. Some collocations may be used in a manner where the constituent words do not adjoin one another. For example, the term 'a school of white and black fish' includes the collocation 'school of fish'.

Collocations in documents must be accurately identified so that generally only documents including relevant information are uncovered. For example, because collocations are typically formed by group of words in close proximity to one another, a user utilizing a search engine to uncover information associated with a specific collocation must use proximity operators when formulating a search query. This technique ensures that documents, including collocations in which the constituent terms do not adjoin one another, are uncovered. However, it desirably precludes uncovering many irrelevant documents that include the constituent terms that are far removed from one another and that do not actually form a collocation.

The use of proximity operators is a burden for the average user. Moreover, permitting the use of proximity operators requires the database to performs the memory intensive task of storing all occurrences of all terms encountered, along with their relative position. Furthermore, this technique may also uncover documents containing documents that are not relevant, but coincidentally include the collocation terms in close proximity to one another. Thus, the precision of the search is diminished.

Precision is a relative measure of relevance. Precision may be calculated by dividing the number of uncovered documents by the number of uncovered documents that the user ascertains to be truly relevant. As shown in Maarek, Yoelle and Smadja, Frank, "Full Text Indexing Based On Lexical Relations," Proceedings of the 12th Annual International ACM SIGIR Conference on Research and Development in Information Retrieval, ACM Press, 1989, hereby incorporated by reference, precision can be enhanced by identifying collocations in documents. Thus, there is a need for a high-precision technique for uncovering relevant documents by identifying collocations in the documents.

To accomplish this goal, groups of words that form collocations in a set of documents collocations must be identified. Several methods, including n-squared statistical algorithms, have been developed to identify those groups of words that are based upon statistical significance. These methods, and related techniques, have been disclosed in Smadja, Frank, "Retrieving Collocations from Text: Xtract," Computational Linguistics, 19(1), 1993, pp. 142–177, hereby incorporated by reference.

These methods typically have a complexity of n-square, where n is the number of words in the set of documents. Moreover, these methods are static. Thus, the collocations must be identified every time the set of documents is altered. The set of documents is altered whenever a new document is added to the set, or when a document in the set is modified. Thus, these methods are computationally and memory intensive.

Therefore, there is a need for a method and apparatus that identifies documents with specified collocations and does so with high precision and in a manner that is less computationally or memory intensive.

SUMMARY OF THE INVENTION

The present invention solves the above-mentioned problems in the art and other problems which will be understood by those skilled in the art upon reading and understanding the present specification. The present invention provides a method and apparatus for implementing a dynamic collocation dictionary.

The method includes the step of ascertaining bigrams and their frequency in a document. Bigrams that are potentially collocations are selected. Entries in a dynamic collocation dictionary are updated for selected bigrams already present in the dynamic collocation dictionary. Selected bigrams, not already present in the dynamic collocation dictionary, are entered in the dynamic collocation dictionary.

In one embodiment, ascertained bigrams are formed by two words within five words of one another in the document. In another embodiment, the selected bigrams include N bigrams that have a frequency of occurrence greater than one. In yet another embodiment, the selected bigrams include P bigrams that have a frequency of occurrence equal to one and have previously been entered into the dynamic collocation dictionary when N is less than H. In yet another embodiment, the selected bigrams include L–P–N bigrams that are randomly selected, when P+N is less than L, wherein L is a minimum number of bigrams to be selected from a document.

The apparatus for retrieving information with a dynamic collocation dictionary may include a computer program product or a computer system. The computer program product may include an ascertaining process enabling a processor to ascertain bigrams and their frequency in a document. A selecting process enables the processor to select bigrams that are potentially collocations. An updating process enables the processor to update entries in a dynamic collocation dictionary for selected bigrams already present in the dynamic collocation dictionary. An entering process enables the processor to enter selected bigrams, not already present in the dynamic collocation dictionary, in the dynamic collocation dictionary.

In one embodiment, the ascertaining process includes a second ascertaining process enabling the processor to ascertain a word bigram formed by two words within five words of one another. In another embodiment, the selecting process comprises a second selecting process enabling the processor to select N bigrams that have a frequency of occurrence greater than one. In yet another embodiment, the selecting process also includes a third selecting process enabling the processor to select P bigrams that have a frequency of occurrence equal to one and have previously been entered into the dynamic collocation dictionary, when N is less than H. The computer system, may include, in addition to the features of the computer program product, a computer including a processor operatively coupled to a memory.

It is a benefit of the present invention that it permits selecting bigrams in a document that may be collocations in a less computationally and memory intensive manner than conventional techniques. It is also an advantage of the present invention that it permits users to enter search queries, including collocations, in free style text. Further features and advantages of the present invention, as well as the structure and operation of various embodiments of the present invention, are described in detail below with reference to the accompanying drawings.

DETAILED DESCRIPTION OF THE EMBODIMENTS

In the following detailed description of the preferred embodiments, reference is made to the accompanying drawings which form a part hereof, and in which are shown by way of illustration specific preferred embodiments in which the invention may be practiced. These embodiments are described in sufficient detail to enable persons skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1:
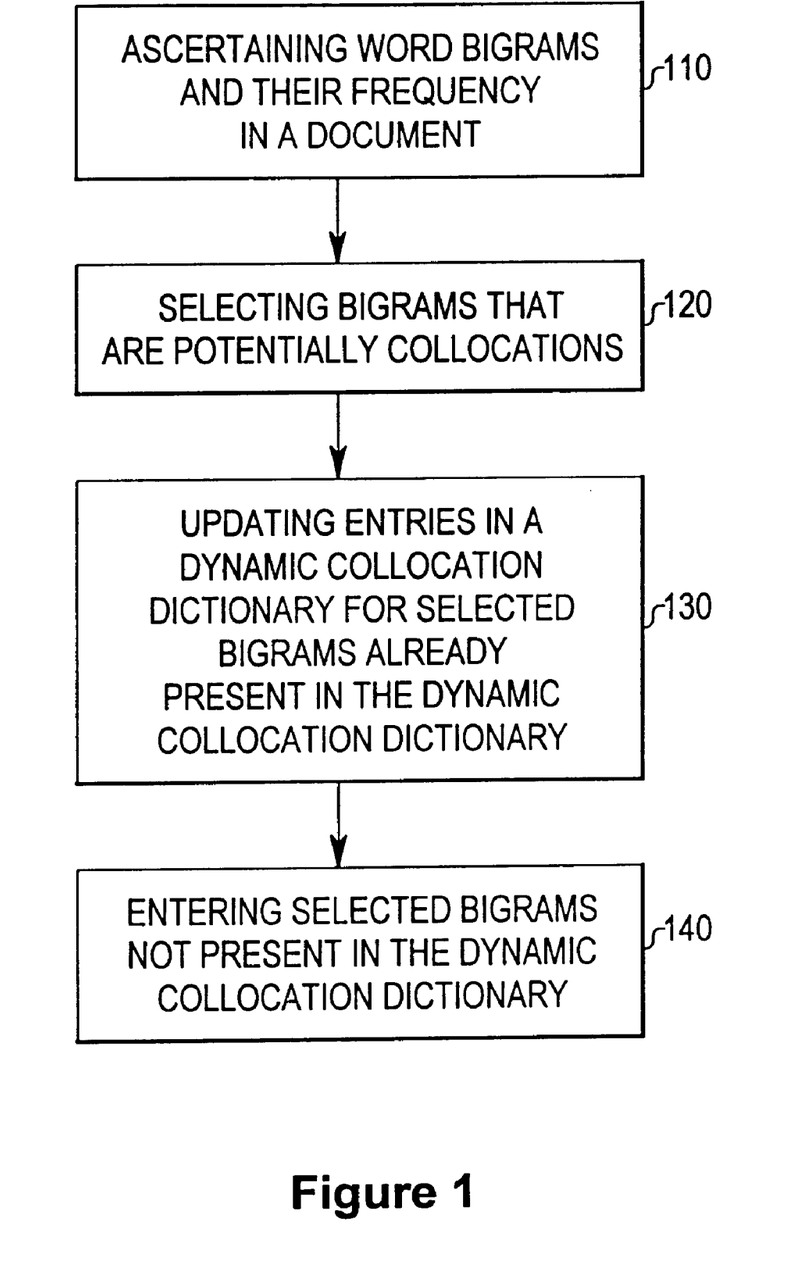
FIG. 1 illustrates one embodiment of the present invention.

The present invention provides a method and apparatus for retrieving information from a set of documents with a dynamic collocation dictionary. The set of documents and the dynamic collocation dictionary, also referred to as CD, are initially empty. For each document added to the set of documents, all possible word bigrams and the bigram frequencies in the document are ascertained (step 110), as illustrated in FIG. 1. A bigram, otherwise referred to as B, is a pair of words within x words of one another, where, for example, x is 5. Bigrams in a document that potentially are collocations are then selected (step 121). Selected bigrams not previously entered into the dynamic collocation dictionary are then entered into the dynamic collocation dictionary (step 140). However, if selected bigrams have been previously entered into the dynamic collocation dictionary, entries in the dynamic collocation dictionary, described below, are accordingly updated (step 130). The dynamic collocation dictionary maintains a list of selected bigrams and their corresponding frequencies of occurrence. Additionally, for example, if it uses an inverted index, the dynamic collocation dictionary also contains names or locations of the documents in which the selected bigrams are located.

One embodiment of the present invention for selecting (step 120) bigrams from a document will now be described. DOC is a document in the set of documents. B(DOC) is the list of all possible bigrams occurring in DOC. L and H are respectively lower and upper bounds for the number of bigrams to be selected from each document. L and H are arbitrarily selected integers, where L is less than H.

Figure 2:
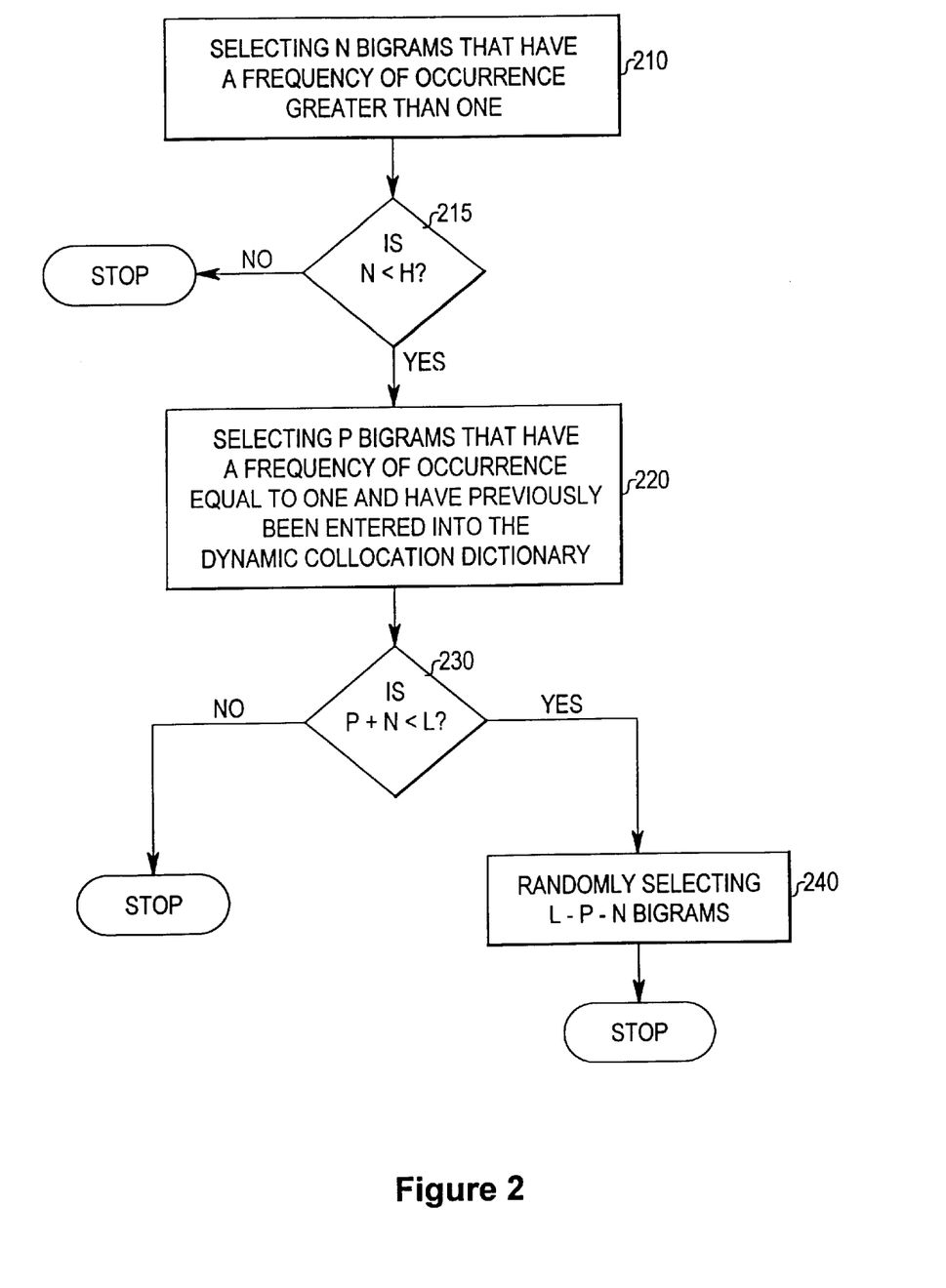
FIG. 2 illustrates a preferred method of selecting bigrams in the embodiment of FIG. 1.

Between L and H bigrams are selected (step 120) from B(DOC) according to the following rules in the order shown below, and as illustrated in FIG. 2:

Rule 1. If one or more bigrams have a frequency of occurrence in the document greater than one, the bigram(s) are selected (step 210). N is the number of bigrams in the document added to or updated in the dynamic collocation dictionary according to Rule 1.

Rule 2. If N is less than H (step 215), and one or more bigram(s) have a frequency of occurrence equal to one and the bigram(s) have previously been entered into the dynamic collocation dictionary, then the bigram(s) are selected (step 220). P is the number of selected bigrams in the document updated in the dynamic collocation dictionary according to Rule 2.

Rule 3. If the number of selected bigrams in the document, P+N, is less than L (step 230), then L–P–N bigrams are randomly selected (step 240). For example, the first L–P–N remaining, or unselected, bigrams are selected.

An exemplary use of the present invention will now be described. Data corresponding to a set of documents including four documents, is stored in a database, or matrix, of an information retrieval system employing a vector-space model, as described in Salton, Gerald, "Automatic Text Processing," Addison-Wesley Series in Computer Science, 1988, which is hereby incorporated by reference. The dynamic collocation dictionary may be part of or separate from the database. The present example illustrates a database including a dynamic collocation dictionary. The data includes words, including bigrams selected with the present invention. The selected bigrams are entered, or stored, in the dynamic collocation dictionary. The dynamic collocation dictionary forms part of the database. In the database, exemplified by Table 1 below, the columns correspond to document names or locations, and the rows correspond to words, including selected bigrams.

After the four documents have been indexed, a corresponding inverted index corresponding to the first four columns of Table 1, is created. For example, the first document contains the word aardvark, the second document includes the words fish, school, and the selected bigram fish-school. The fourth document also contains the words fish and school, but does not contain the selected bigram fish-school, probably because the words were far apart. When issuing a query, the vector representation of the query will be compared with the vector representations of the 4 documents, illustrated by Table 1. A query may contain, for example, the words fish, school, and the collocation fish-school. The relevance score of each document is then based on some measure of similarity derived from a cosine measure of the document vector and the query vector. As a result, document 2 will have a higher relevance score than document 4 because document 2 contains the collocation, but document 4 does not.

TABLE 1

|  | doc-1 | doc-2 | doc-3 | doc-4 | Query |
|---|---|---|---|---|---|
| aardvark | ☆ |  |  |  |  |
| fish |  | ★ |  | ★ | ★ |
| school |  | ★ |  | ★ | ★ |
| Microsoft |  |  | ☆ |  |  |
| zebra |  |  | ☆ |  |  |
| fish school |  | ★ |  |  | ★ |
| fried fish |  |  | ☆ |  |  |
| Microsoft network |  |  |  | ☆ |  |
| zebra herd | ☆ |  |  |  |  |

Figure 3:
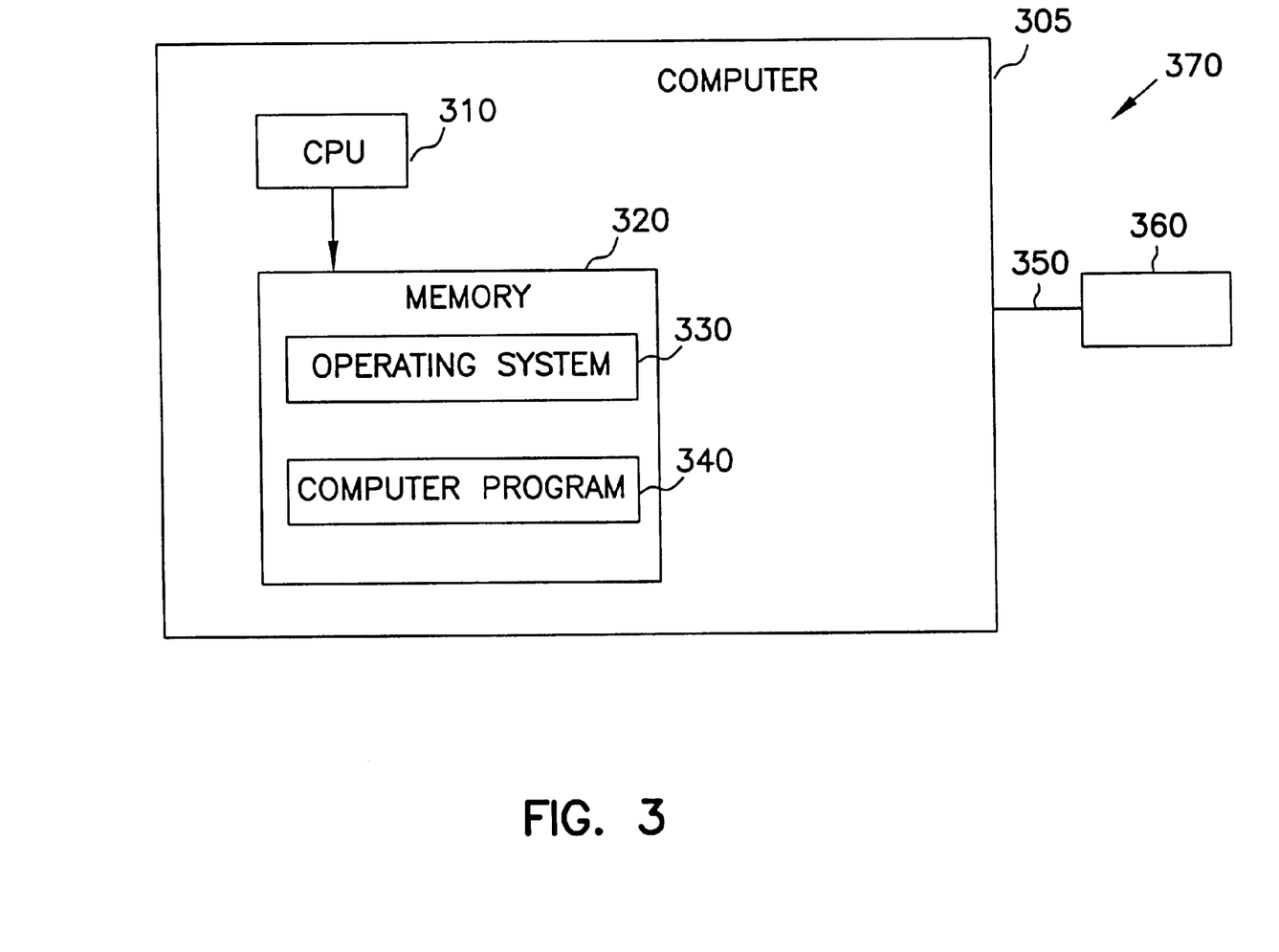
FIG. 3 illustrates an exemplary block diagram of one embodiment of a computer system.

The method described above may be implemented as a computer program. The computer program may be executed on a computer. FIG. 3 illustrates an exemplary computer 305 in which the computer program 340 may reside and be executed. The computer 305 may be any processing system for executing the computer program 340, including, but not limited to, personal and main frame computers.

The computer 305 may include a central processing unit 310 and memory 320. The processing unit 310 may be, but is not limited to, a Pentium microprocessor by Intel Corporation (Santa Clara, Calif.). The memory 320 can be random access memory, disk storage, CD-ROM storage, digital video, or versatile, disk (DVD), another type of memory or combinations thereof. Within the memory 320, the computer 305 has access to its operating system 330 and the computer program 340. Exemplary pseudocode for implementing the present invention as a computer program 340 is illustrated below in Tables 1 through 4.

The computer 305 may be part of a computer system 370, such as a computer network. The computer system 370 may be the Internet, a wide area network, a local area network, or a portion or combination thereof. The computer system 370 may include a second computer 360 coupled to the computer 305. The computer 350 and second computer 360 are coupled by a communications system 350 formed by a wireline system, wireless system, or combination thereof.

The computer 305 and the second computer 360 may have comparable functions and/or structures. Alternatively, the computer 305 and the second computer may have dissimilar functions and/or structures, for example, respectively being a server and a client in a computer network 370 that is a client-server network. The method described above may be substantially or completely performed on the server, while the results, such as search results, are presented to a user through the client.

CONCLUSION

The present invention provides a method and apparatus for dynamically selecting bigrams that may be collocations in a set of documents. The invention may be used in a dynamic information retrieval system, for example, for information filtering to improve precision.

The present invention permits selecting bigrams in a document that may be collocations in a less computationally and memory intensive manner than conventional techniques. It is also an advantage of the present invention that users may enter search queries, including collocations, in free style text.

It is understood that the above description is intended to be illustrative, and not restrictive. Many embodiments will be apparent to those skilled in the art upon reviewing the above description. For example, other implementations of computers, using state machines, parallel processors, or combinations thereof, may be utilized. Hence, the scope of the invention should, therefore, be determined with reference to the appended claims, along with the full scope of equivalents to which such claims are entitled.

TABLE 1

PSEUDOCODE

```
/* We generate all the valid bigrams from the stack of words and insert
them into the temporary collocation holder: bigrams. This is done for
all the potential bigrams involving the word in position I in the stack */
void Generate__Bigrams(int I)
{
    int j, l=0, strcmp__result=0;
    if (strlen(wstack[i]) > 0)
    {
        /* We first look before i */
        for (j=0; j<i; j++)
        {
            l = strlen(wstack[j]);
            if(l > 0)
            {
                strcmp__result = strcmp(wstack[j], wstack[i]);
                if (strcmp__result < 0)
                    insert__in__bigrams (wstack[j], wstack[i],
                        Bigrams);
                else if (strcmp__result > 0)
                    insert__in__bigrams(wstack[i], wstack[j],
                        Bigrams);
            }
        }
        /* Then we look after I */
        for (j = I+1; j<DEFAULT__WINDOW__SIZE; j++)
        {
            l = strlen(wstack[j]);
            if(l > 0)
            {
                strcmp__result = strcmp(stack[j], wstack[i]);
                if (strcmp__result < 0)
                    insert__in__bigrams(wstack[j], wstack[i],
                        Bigrams);
                else if (strcmp__result > 0)
                    insert__in__bigrams(wstack[i], wstack[j]);
}   }   }   }
```

Copyright ASAP, Ltd.

TABLE 2

```
/* One new word is being added to the stack */
void Add__One__Word__2__Wstack(char *word)
{
    int I=0, l=0;
    I = wstack__index;
    /* We first push out the previous word in the same position by
    generating all its valid bigrams */
    Generate__Bigrams(i);
    /* replace the previous word with the new one */
    bzero(wstack[i], Wsize);
```

TABLE 2-continued

```
    strncpy(wstack[i], word, Wsize);
    /* update the current position */
    I++;
    if(I >= DEFAULT_WINDOW_SIZE)
        I = DEFAULT_WINDOW_SIZE -I;
    wstack_index = I;
}
```

Copyright ASAP, Ltd.

TABLE 3

```
/* At the end of the processing of the document, we need to terminate the
processing of the stack also. We also at this stage select from the list of
bigrams all the valid collocations */
void Terminate_Wstack( )
{
    /* We generate all the remaining bigrams from the stack */
    for (I=0; i<DEFAULT_WINDOW_SIZE; I++)
    {
        Generate_Bigrams(I);
        bzero(wstack[i], WORDsize);
    }
/* We count frequency for all the bigrams already obtained and
we sort the bigrams by decreasing order of frequency */
sort_bigrams( );
/* We traverse all the bigrams in decreasing order of frequency */
while (browse_bigrams(bigram) == SUCCESS)
{
        if(bigram.frequency > 1)
        {
            insert_bigram_in_Collocation_Dictionary(bigram, freq);
            insert bigram_in_stemmed_Document(bigram,
            Stemmed_Document);
            N_COLLOCATIONS++;
        }
        else
        {
            if (bigram_has_already_been_entered_as_Collocation
            (bigram) == SUCCESS)
            {
                insert_bigram_in_Collocation_Dictionary(bigram,
                freq);
                insert_bigram_in_stemmed_Document(bigram,
                Stemmed_Document);
                N_COLLOCATIONS++;
            }
            else
            {
                if ((N_COLLOCATIONS <
                MAX_NUMBER_OF_COLLOCATIONS))
                {
                    insert_bigram_in_Collocation_Dictionary
                    (bigram, freq);
                    insert_bigram_in_stemmed_Document
                    (bigram, Stemmed_Document);
                    N_COLLOCATIONS++;
                }
                else
                    break;
    }  }  }
```

Copyright ASAP, Ltd.

TABLE 4

```
/* We skip one position on the stack. This is equivalent to storing a
null word */
void Skip_One_Word_2_Wstack( )
{
    int I, I=0;
    I = wstack_index;
    Generate_Bigrams(I);
    bzero(wstack[i], Wsize);
    I++;
    if (I >= DEFAULT_WINDOW_SIZE)
```

TABLE 4-continued

```
        I = DEFAULT_WINDOW_SIZE -I;
    wstack_index = I;
}
```

Copyright ASAP, Ltd.

I claim:

1. A computer-implemented method for updating a dynamic collocation dictionary having a plurality of bigram entries, each bigram entry identifying a bigram and associated frequency of occurrence, said method comprising the steps of:

identifying a selected bigram in a document;

determining a frequency of occurrence of the selected bigram in the document; and updating the dynamic collocation dictionary with the selected bigram on the basis of the frequency of occurrence of the selected bigram and the existence, in the dynamic collocation dictionary, of a bigram entry corresponding to the selected bigram wherein the dynamic collocation dictionary is updated with at least a predetermined positive minimum number of bigrams selected in the document.

2. The method of claim 1, further comprising the step of using the selected bigram for information retrieval.

3. The method of claim 2, further comprising the step of using the selected bigram for information filtering.

4. The method of claim 1, wherein the step of identifying a selected bigram comprises the step of identifying a bigram having a first constituent word and a second constituent word, said first and second constituent words being separated by no more than a selected plurality of intervening words.

5. A computer system for updating a dynamic collocation dictionary having a plurality of bigram entries, each bigram entry identifying a bigram and associated frequency of occurrence, said computer system comprising:

a first computer, said first computer including,
a processor;
a memory, operatively coupled to the processor;
an identification process for enabling the processor to identify a selected bigram in a document;
a counting process for determining a frequency of occurrence of the selected bigram in the document; and
an updating process enabling the processor to update entries in a dynamic collocation dictionary with the selected bigram on the basis of the frequency of occurrence of the selected bigram and the existence, in the dynamic collocation dictionary, of a bigram entry corresponding to the selected bigram wherein the dynamic collocation dictionary is updated with at least a predetermined positive minimum number of bigrams selected in the document.

6. The computer system of claim 5, further comprising a use process for enabling the processor to use the selected bigram for information retrieval.

7. The computer system of claim 5, further comprising a second use process for enabling the processor to use the selected bigram for information filtering.

8. The computer system of claim 5, wherein the identification process comprises a second identification process enabling the processor to identify a bigram having a first constituent word and a second constituent word, said first and second constituent words being separated by no more than a selected plurality of intervening words.

9. The computer system of claim 5, further comprising:
a second computer; and
a communications system operatively coupling the first computer and the second computer to form a computer network.

10. The computer system of claim 9, wherein the second computer is a client and the first computer is a server.

11. The method of claim 1 wherein the step of updating the dynamic collocation dictionary comprises the steps of:
determining that no selected bigram entry corresponding to the selected bigram exists in the dynamic collocation dictionary;
adding, to the dynamic collocation dictionary, a bigram entry corresponding to the selected bigram.

12. The method of claim 11 wherein the step of adding a bigram entry corresponding to the selected bigram comprises the steps of:
selecting an upper threshold representative of the number of new bigram entries that can be created in the dynamic collocation dictionary from selected bigrams in the document;
inspecting a new entry counter to determine how many new bigram entries have been created in the dynamic collocation dictionary;
incrementing the associated frequency of occurrence only if the new entry counter is below the upper threshold.

13. The method of claim 1 wherein the step of updating the dynamic collocation dictionary comprises the steps of:
determining that a selected bigram entry corresponding to the selected bigram exists in the dynamic collocation dictionary;
updating the selected bigram entry to be indicative of the frequency of occurrence of the selected bigram.

14. The method of claim 13 wherein the step of updating the selected bigram entry comprises the steps of:
determining that the frequency of occurrence of the selected bigram is greater than one; and
incrementing the associated frequency of occurrence of the selected bigram entry by an amount representative of the frequency of occurrence of the selected bigram.

15. The method of claim 13 wherein the step of updating the selected bigram entry comprises the steps of:
selecting a lower threshold representative of the minimum number of bigram entries that must be updated in the dynamic collocation dictionary using selected bigrams from the document;
selecting additional bigrams from the document to the extent necessary to ensure that the number of bigram entries updated in the dynamic collocation dictionary is in excess of the lower threshold.

16. The computer system of claim 5 wherein the updating process comprises:
a second determining process for determining that a selected bigram entry corresponding to the selected bigram exists in the dynamic collocation dictionary;
a second updating process for updating the selected bigram entry to be indicative of the frequency of occurrence of the selected bigram.

17. The computer system of claim 18 wherein the collocation adding process comprises:
a first threshold selection process for selecting an upper threshold representative of the number of new bigram entries that can be created in the dynamic collocation dictionary from selected bigrams in the document;
an inspection process for inspecting a new entry counter to determine how many new bigram entries have been created in the dynamic collocation dictionary;
a conditional incrementing process for incrementing the associated frequency of occurrence only if the new entry counter is below the upper threshold.

18. The computer system of claim 5 wherein the updating process comprises:
a first determining process for determining that no selected bigram entry corresponding to the selected bigram exists in the dynamic collocation dictionary;
a collocation adding process to add, to the dynamic collocation dictionary, a bigram entry corresponding to the selected bigram.

19. The computer system of claim 16 wherein the second updating process comprises:
a third determining process for determining that the frequency of occurrence of the selected bigram is greater than one; and
an incrementing process for incrementing the associated frequency of occurrence of the selected bigram entry by an amount representative of the frequency of occurrence of the selected bigram.

20. The computer system of claim 16 wherein the second updating process comprises:
a second threshold selecting process for selecting a lower threshold representative of the minimum number of bigram entries that must be updated in the dynamic collocation dictionary using selected bigrams from the document;
a bigram selection process for selecting additional bigrams from the document to the extent necessary to ensure that the number of bigram entries updated in the dynamic collocation dictionary is in excess of the lower threshold.

21. A computer-readable medium having encoded thereon software for updating a dynamic collocation dictionary having a plurality of bigram entries, each bigram entry identifying a bigram and associated frequency of occurrence, said software comprising instructions for executing the steps of:
identifying a selected bigram in a document;
determining a frequency of occurrence of the selected bigram in the document; and
updating the dynamic collocation dictionary with the selected bigram on the basis of the frequency of occurrence of the selected bigram and the existence, in the dynamic collocation dictionary, of a bigram entry corresponding to the selected bigram wherein the dynamic collocation dictionary is updated with at least a predetermined positive minimum number of bigrams selected in the document.

22. The computer-readable medium of claim 21, wherein the software further comprises instructions for executing the step of using the selected bigram for information retrieval.

23. The computer-readable medium of claim 21, wherein the software further comprises instructions for executing the step of using the selected bigram for information filtering.

24. The computer-readable medium of claim 21 wherein the instructions for executing the step of updating the dynamic collocation dictionary comprise instructions for executing the steps of:
determining that no selected bigram entry corresponding to the selected bigram exists in the dynamic collocation dictionary;

adding, to the dynamic collocation dictionary, a bigram entry corresponding to the selected bigram.

25. The computer-readable medium of claim 24 wherein the instructions for executing the step of adding a bigram entry corresponding to the selected bigram comprise instructions for executing the steps of:

selecting an upper threshold representative of the number of new bigram entries that can be created in the dynamic collocation dictionary from selected bigrams in the document;

inspecting a new entry counter to determine how many new bigram entries have been created in the dynamic collocation dictionary;

incrementing the associated frequency of occurrence only if the new entry counter is below the upper threshold.

26. The computer-readable medium of claim 21 wherein the instructions for executing the step of updating the dynamic collocation dictionary comprise instructions for executing the steps of:

determining that a selected bigram entry corresponding to the selected bigram exists in the dynamic collocation dictionary;

updating the selected bigram entry to be indicative of the frequency of occurrence of the selected bigram.

27. The computer-readable medium of claim 26 wherein the instructions for executing the step of updating the selected bigram entry comprise instructions for executing the steps of:

determining that the frequency of occurrence of the selected bigram is greater than one; and incrementing the associated frequency of occurrence of the selected bigram entry by an amount representative of the frequency of occurrence of the selected bigram.

28. The computer-readable medium of claim 26 wherein the instructions for executing the step of updating the selected bigram entry comprise instructions for executing the steps of:

selecting a lower threshold representative of the minimum number of bigram entries that must be updated in the dynamic collocation dictionary using selected bigrams from the document;

selecting additional bigrams from the document to the extent necessary to ensure that the number of bigram entries updated in the dynamic collocation dictionary is in excess of the lower threshold.

29. The computer-readable medium of claim 21, wherein the instructions for executing the step of identifying a selected bigram comprise instructions for executing the step of identifying a bigram having a first constituent word and a second constituent word, said first and second constituent words being separated by no more than a selected plurality of intervening words.

* * * * *